United States Patent Office 3,209,899
Patented Oct. 5, 1965

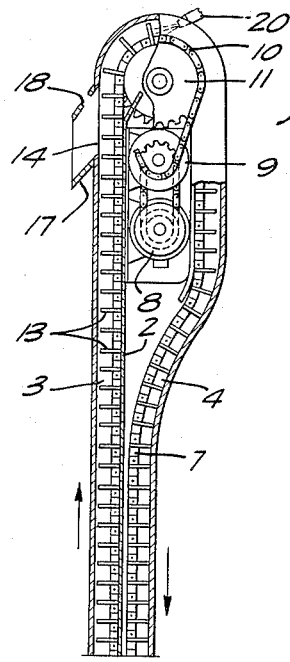
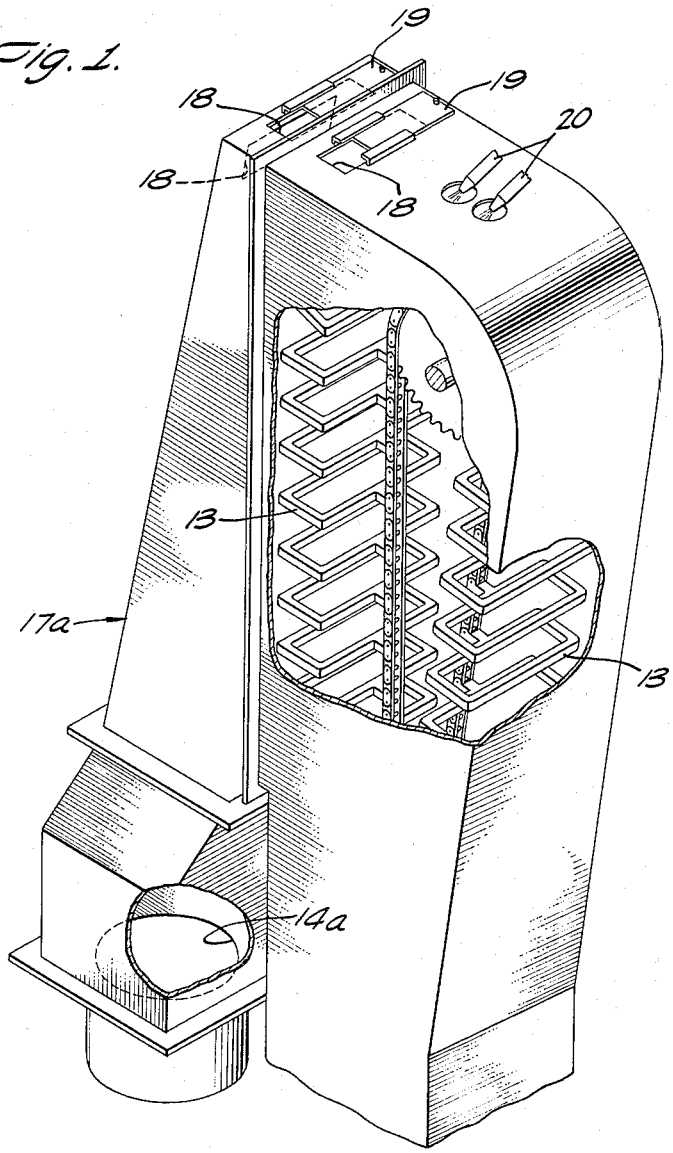
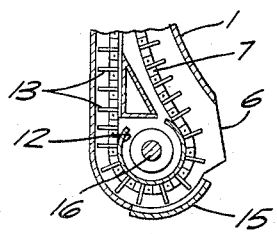
Fig. 1.
Fig. 2.
Fig. 3.
CHARLES L. FRIEDMANN
LOUIS G. NANNINI
GEORGE B. MENDEN
INVENTORS
BY James R. Thornton
AGENT

3,209,899
CONVEYOR
Charles L. Friedmann, North Edwards, Louis G. Nannini, Redondo Beach, and George B. Menden, Boron, Calif., assignors to United States Borax & Chemical Corporation, Los Angeles, Calif., a corporation of Nevada
Filed May 8, 1963, Ser. No. 278,924
4 Claims. (Cl. 198—206)

This invention relates to conveying means for transferring solid particulate materials and more particularly to improved endless chain conveyors.

Chain conveyors of the so called "Redler" type and "Buhler" type as described in U.S. Patents 2,311,084 and 2,416,489 respectively, are well known and have been used for loading and unloading of bulk chemicals, grains, or other solid particulate flowable materials. Such apparatus, however, have the disadvantage of a limited hauling output or delivery which cannot be appreciably improved by an increase in rate of chain travel or increased horsepower.

It is therefore, the principal object of this invention to provide an improved endless chain conveyor for transferring loose materials having an increased output at a constant rate of chain travel and horsepower.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a longitudinal section through a conveyor element according to the invention;

FIG. 2 shows the charging end of the conveyor element in section with gate 15 in a changed position; and FIG. 3 is an enlarged perspective view, partially broken away, of a modification of the discharge end of the conveyor element.

Referring more particularly to the drawings the chain conveyor represented in FIG. 1 forms a complete conveyor unit and comprises a closed casing 1 having material charging openings 5 and 6 and a material discharge opening 14. Casing 1 is separated by a partition wall 2 into a material conveying trough section 3 and return section 4.

The lower or charging end of casing 1 where inlet openings 5 and 6 are located can be provided if desired with a movable gate 15 which is pivotally mounted on a pin 16. This gate can be brought into the two positions shown in FIGS. 1 and 2 respectively. When the conveyor element is lowered into the material to be moved, then gate 15 is brought into the position shown in FIG. 1. The materials to be transferred enter through openings 5 and 6 and are picked up by the chain arms 13 and moved along casing section 3 to the discharge opening 14. If it is desired to link together two conveyor elements of the kind shown in FIG. 1, then gate 15 is brought to the position shown in FIG. 2 where it closes opening 5. The discharge chute 17 of the one unit is inserted into opening 6 of the other unit whereby an elongated conveyor element is formed. The lower unit having gate 15 in the position shown in FIG. 1 is inserted into the material to be transferred, the material enters through inlet openings 5 and 6 where it is carried through casing section 3 and is discharged through outlet 14 into inlet opening 6 of the upper unit, wherein turn it is conveyed to the discharge opening 14 of the upper unit.

At the upper end of the casing the two sections 3 and 4 form a loop within which the drive for conveyor chain 7 is mounted. The drive comprises a motor 8 connected to a reduction gear 9 from which movement is transmitted as by a chain or belt 10 to the driving wheel 11 of the conveyor chain 7. At the lower or charging end, the conveyor chain 7 passes over guide 12.

Conveyor chain 7 is provided with a plurality of conveyor arms 13, which can be U-shaped, rectangular, etc. Material enters through charging openings 5 and 6 and is lifted in a continuous stream through casing section 3 by conveyor arms 13.

As noted previously the prior art conveyors have the disadvantage of a limited delivery or output which can be only slightly improved by an increase in the speed of the chain. These prior art conveyors, which have substantially dust tight casings, when submerged in the material to be transferred operate as a closed circuit and material is carried back down the chain return section rather than being released through the discharge. The discharge openings do not, as assumed by those skilled in the art, provide adequate "air breathing" and in effect a vacuum is set up by the continuous flow of air through the casing which causes the material to be carried past the discharge opening and returned down the conveyor.

We have found that if means are provided in the upper end of the casing for producing a draft, the delivery output of such chain conveyors can be dramatically increased. The draft can be obtained by the use of "air breather" openings, which openings provide a natural draft or an air blower, air jets, etc. can be used for providing a mechanical draft.

Referring first to the air breather openings, attention is especially directed to FIG. 3. Breather openings 18 are placed in the upper end of the casing at a point removed from discharge opening 14a. One such breather opening can be used or a plurality of openings can be used, however, for maximum efficiency the air breather should preferably provide a total area of from about 30 to about 250 square inches. Whether one or more air breather openings are used, they should be placed in the top or adjacent the top of the casing at a point in front of where the conveyor arms make their turn and go down the return section of the casing. Placing the breather openings as directed, air enters the casing at a rate of from about 3000 to 4000 cubic feet per minute. By the use of such air breather openings the delivery of the conveyor increases from about 295 tons per hour to 330 tons per hour at a constant chain speed of about 250 feet per minute and at a chain speed of about 400 feet per minute the delivery increases from about 295 tons per hour to about 400 tons per hour.

If desired, mechanical means can be used to produce the same effect as the foregoing air breather openings. If air jets etc. are used to provide the necessary draft, then they should be arranged so that the air entering the casing strikes the conveyor arms at any point before they turn downwardly into the return section of the casing, as shown in FIG. 3, by air jets 20.

At chain speeds above about 400 feet per minute the air breather openings do not effectively increase the delivery of the conveyor unit. It is at this point that the use of a mechanically induced draft becomes desirable. With the use of an air blower, air jets, etc. the output of the conveyor increases from about 400 tons per hour at a chain speed of about 400 feet per minute to an output of about 450 tons per hour at a chain speed of about 450 feet per minute, whereas using the air breathers without the mechanically induced draft the output remains substantially constant at chain speeds from 400 to 450 feet per minute.

Thus, it is to be understood that if desired, air breather openings can be used alone, mechanical source of air can be used alone, or they can be used in combination. For example if an operator desires to run his conveyor at chain speeds of from about 250 to about 400 feet per minute he can do so with doors 19 in the open position without air supply 20 in operation. If the operator desires to run his conveyor at speeds above about 400 feet per minute he can close doors 19 and turn on air supply 20 to obtain maximum output.

A commercially available chain conveyor known as the "Buhler Marine-Leg Type SKT-11" was used in the following tests. The conveyor as purchased had a lower inlet portion as shown in FIG. 1 and an upper discharge portion as shown in FIG. 3 except that it did not have any draft means.

The material conveying capacity or hauling output of the above identified conveyor is rated by the manufacturer at 250 tons per hour. The conveyor was inserted into a pile of borax and a series of tests were performed at chain speeds of 250, 321, 372 and 400 feet per minute. These tests were run with the idea that the output of the conveyor could be increased by increasing the chain speed, however, the hauling output of the conveyor remained subtsantially constant at about 295 tons per hour.

Air breathers 18 with sliding doors 19 were installed in chute 17a and a series of tests were run with doors 19 in the open position at chain speeds of 230, 321, 372 and 400 feet per minute. These chain speeds resulted in a delivery of 330, 340, 366 and 401 tons per hour respectively. With doors 19 in the closed position covering breather openings 18 and with air jets 20 supplying about 8000 cubic feet per minute of air, the conveyor delivered about 450 tons per hour at a chain speed of about 450 feet per minute.

Attention is directed to the following table which clearly illustrates the totally unexpected results obtained with the modification of the present invention.

| Modified Conveyor of Present Invention | | Conveyor of Prior Art | |
| --- | --- | --- | --- |
| Chain Speed In Ft./Min. | Average Output In Tons/Hr. | Chain Speed In Ft./Min. | Average Output In Tons/Hr. |
| 230 | 330 | 250 | 295 |
| 321 | 340 | 321 | 292 |
| 372 | 366 | 372 | 295 |
| 400 | 401 | 400 | 298 |

Thus, the conveyor with the modification of the present invention delivered 35 tons per hour more at 230 feet per minute than the prior art conveyor did at 250 feet per minute and at a chain speed of 400 feet per minute the present modified conveyor delivered over 100 tons per hour more than the prior art conveyor.

Other modes of applying the principle of the invention may be employed, change being made as regards the details described, provided the features stated in any of the following claims or the equivalent of such be employed.

We, therefore, particularly point out and distinctly claim as our invention:

1. An endless chain conveyor for moving particulate material, comprising in combination a casing having separated material delivery and chain return sections with top and bottom portions connecting said delivery and return section, a charge opening in said bottom portion for receiving the particulate material, a discharge chute with discharge opening in said top portion, an endless conveying element mounted in said casing provided with a plurality of spaced transverse flights traversable through said casing to effect the movement of said particulate material therethrough, drive means mounted on said casing for moving said endless conveying element, means in said top portion for admitting air to said casing adjacent said discharge opening whereby air is communicated to said chain before said chain turns into the return section of the casing; and means mounted on said casing for directing a stream of air into said casing through said air admitting means.

2. The conveying apparatus of claim 1 wherein the air admitting means comprise openings in said casing having a total area of from about 30 to about 250 square inches.

3. An endless chain conveyor for moving particulate material comprising in combination a substantially dust-tight casing having separated longitudinally disposed material delivery and chain return sections with top and bottom portions connecting said delivery and return sections, a discharge chute with discharge opening in the top portion, a charge opening in said bottom portion for receiving said particulate material, a gate movably mounted on the bottom portion of the casing able to occupy a position at one side of the charge opening when said bottom portion is submerged in the material to be conveyed, an endless conveying element mounted in said casing provided with a plurality of spaced transverse flights traversable through said casing to effect movement of said particulate material therethrough, drive means mounted on said casing for moving said endless conveying element and means in said top portion for admitting air to said casing adjacent said discharge opening whereby air is communicated to said chain before said chain turns into the return section of the casing; and means mounted on said casing for directing a stream of air into said casing through said air admitting means.

4. In an endless chain conveyor for moving particulate material which includes a casing having separated material delivery and chain return sections with top and bottom portions connecting said delivery and return sections, a charge opening in said bottom portion for receiving the particulate material, a discharge chute with a discharge opening, said discharge opening being communicated to the interior of said casing in said top portion, an endless chain movably mounted in said casing, drive means mounted on said casing for moving said endless chain, the improvement comprising: means in said top portion for admitting air to said casing adjacent said discharge opening whereby air is communicated to said chain before said chain turns into the return section of the casing and means mounted on said casing for directing a stream of air into said casing through said air admitting means.

References Cited by the Examiner

UNITED STATES PATENTS

| 1,433,754 | 10/22 | Stone | 198—206 |
| 2,416,489 | 2/47 | Meyer | 198—207 |
| 2,585,472 | 2/52 | Kennedy. | |

FOREIGN PATENTS

| 112,918 | 8/01 | Germany. |
| 309,639 | 10/17 | Germany. |

SAMUEL F. COLEMAN, *Primary Examiner.*

ERNEST A. FALLER, *Examiner.*